(No Model.) 10 Sheets—Sheet 1.

F. D. MALTBY.
MACHINE FOR MAKING TYPE MATRICES.

No. 329,466. Patented Nov. 3, 1885.

Witnesses.
Robert Everett.
J. A. Rutherford

Inventor:
Frank D. Maltby.
By James L. Norris
Atty (No Model.) 10 Sheets—Sheet 2.

F. D. MALTBY.
MACHINE FOR MAKING TYPE MATRICES.

No. 329,466. Patented Nov. 3, 1885.

Witnesses
Robert Everett
J. A. Rutherford

Inventor
Frank D. Maltby
By James L. Norris, Atty

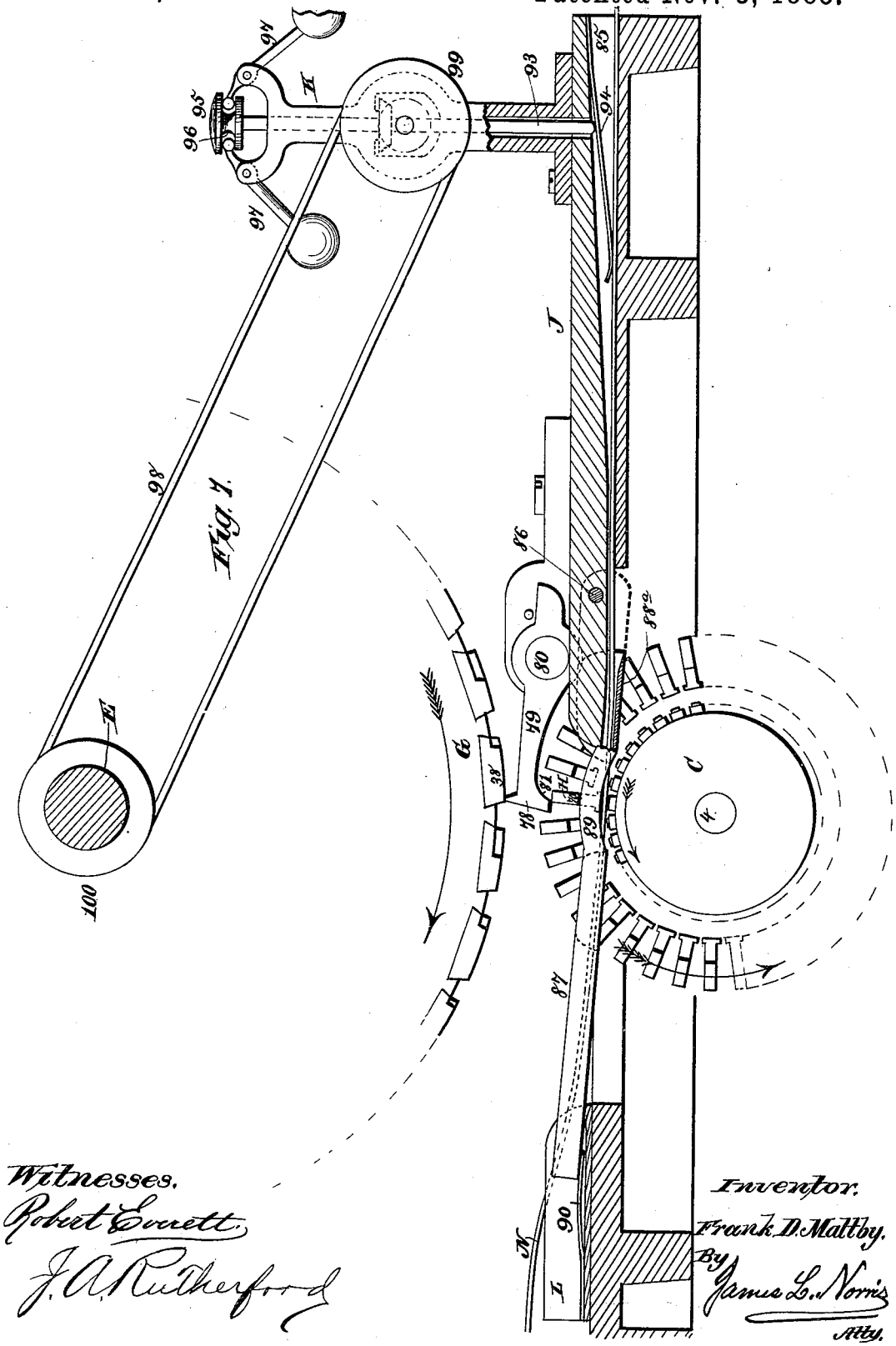

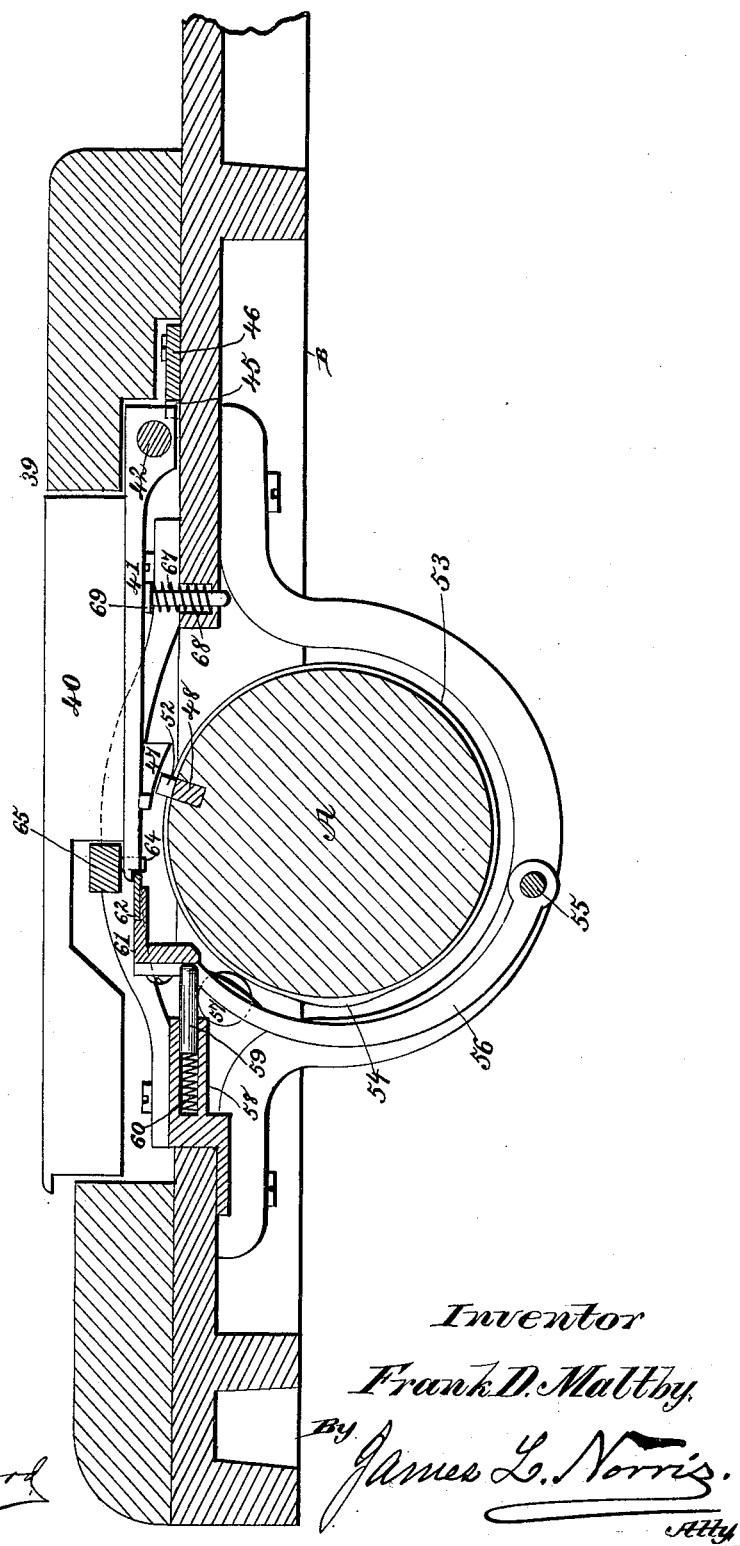

(No Model.) 10 Sheets—Sheet 5.
F. D. MALTBY.
MACHINE FOR MAKING TYPE MATRICES.
No. 329,466. Patented Nov. 3, 1885.
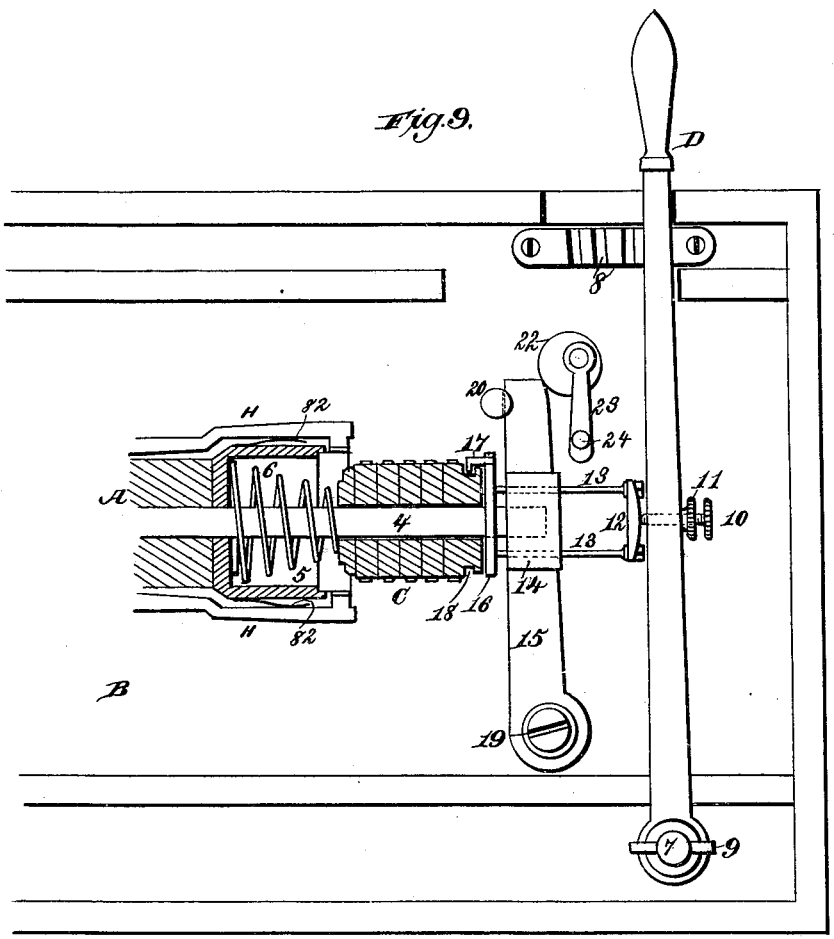
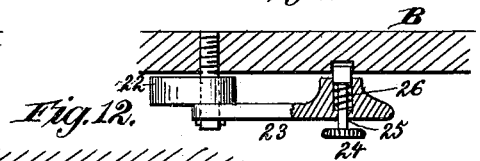
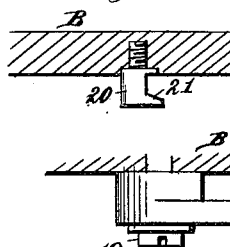
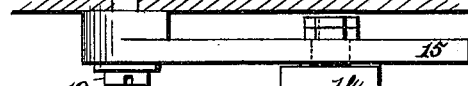
Witnesses,
Robert Everett
J. A. Rutherford
Inventor
Frank D. Maltby.
By James L. Norris.
Atty.

(No Model.) 10 Sheets—Sheet 6.
F. D. MALTBY.
MACHINE FOR MAKING TYPE MATRICES.
No. 329,466. Patented Nov. 3, 1885.
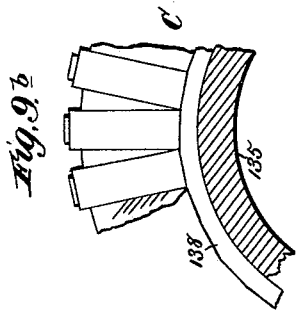
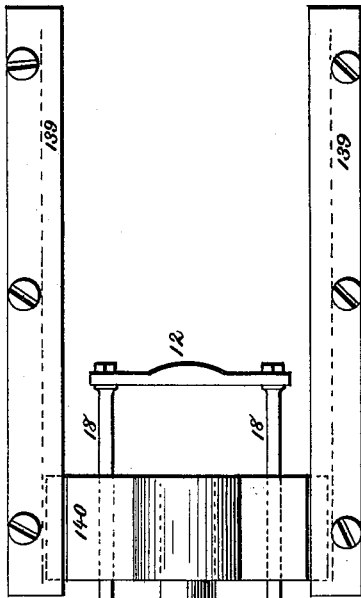
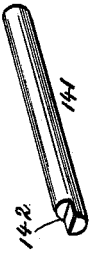
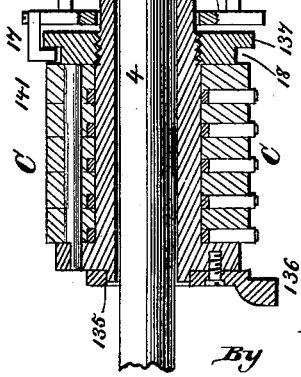
Witnesses,
Robert Everett,
J. A. Rutherford
Inventor,
Frank D. Maltby,
By James L. Norris,
Atty (No Model.) 10 Sheets—Sheet 7.
F. D. MALTBY.
MACHINE FOR MAKING TYPE MATRICES.
No. 329,466. Patented Nov. 3, 1885.
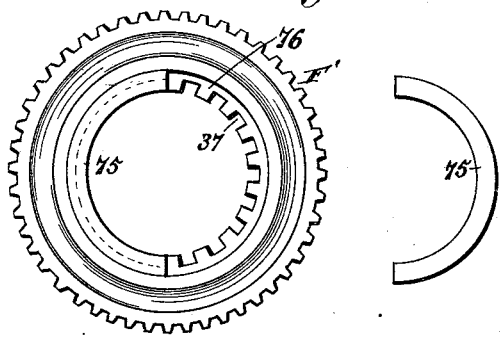
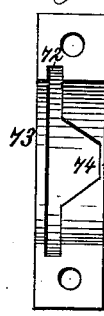
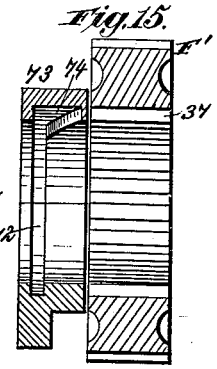
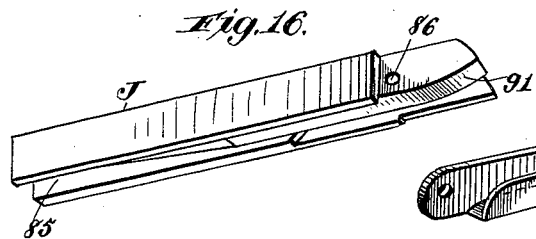
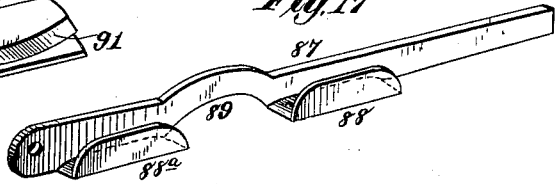
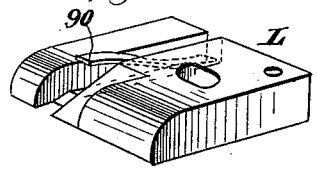
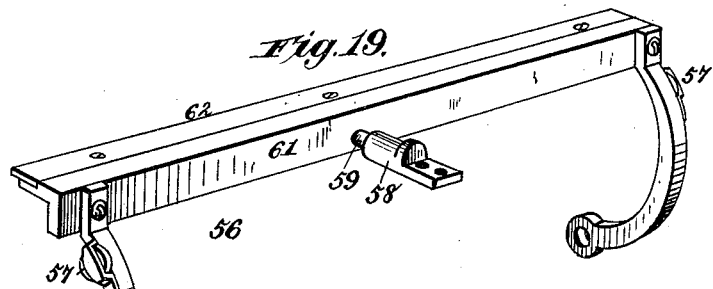
Witnesses,
Robert Evutt
J. A. Rutherford
Inventor,
Frank D. Maltby.
By James L. Norris.
Atty.

(No Model.)
10 Sheets—Sheet 8.
F. D. MALTBY.
MACHINE FOR MAKING TYPE MATRICES.
No. 329,466. Patented Nov. 3, 1885.
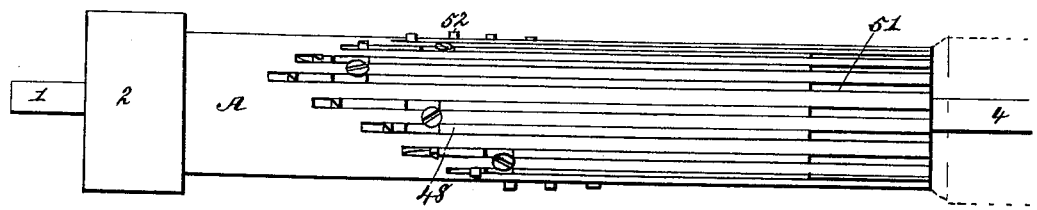
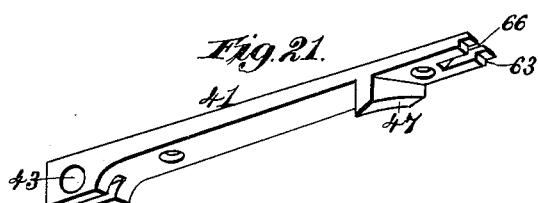
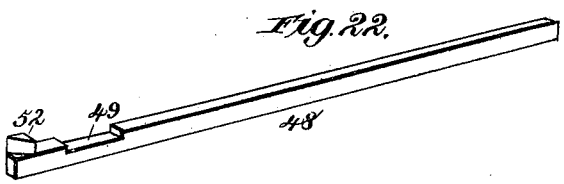
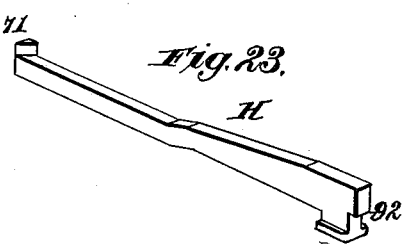
Witnesses.
Robert Emmett,
J. A. Rutherford
Inventor.
Frank D. Maltby,
By James L. Norris,
Atty.

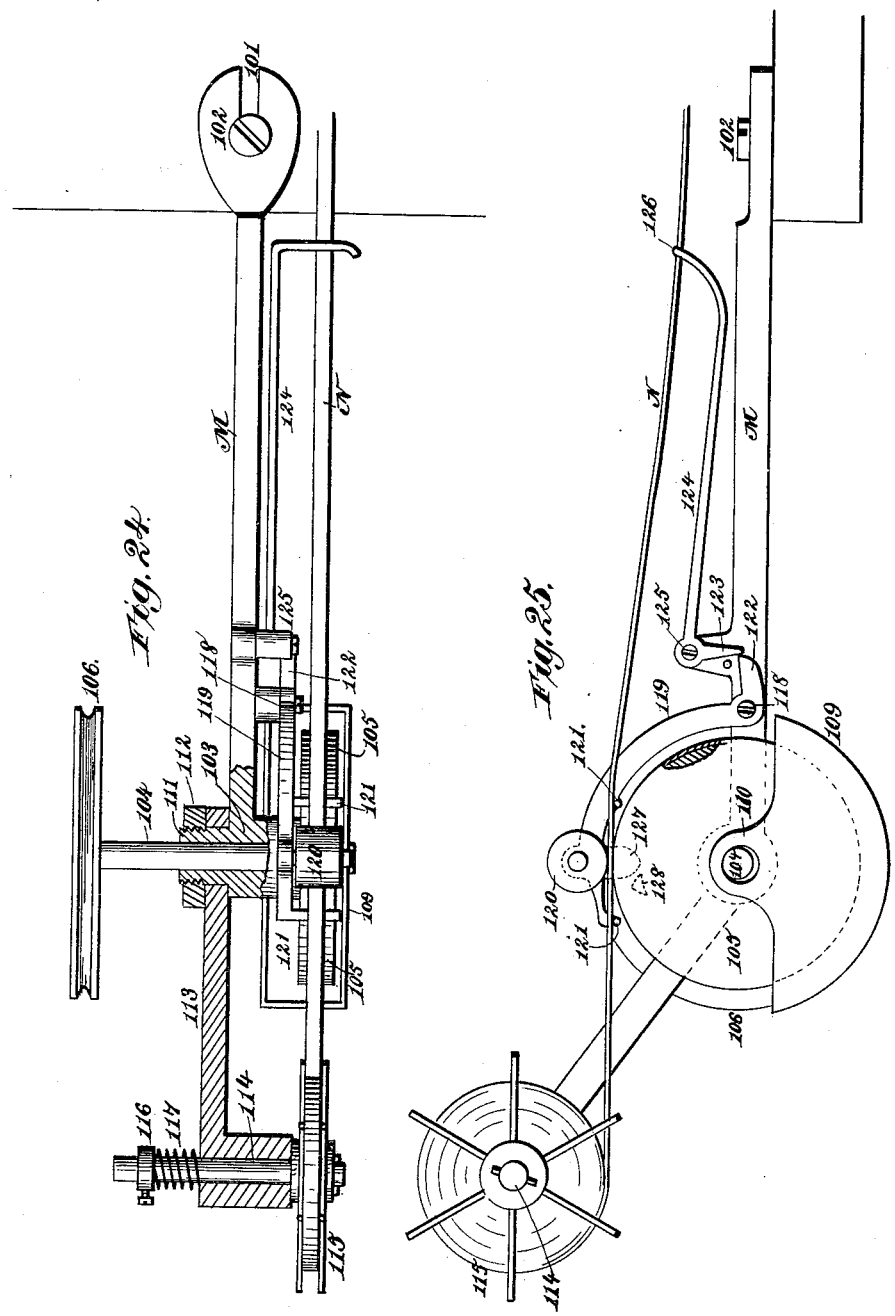

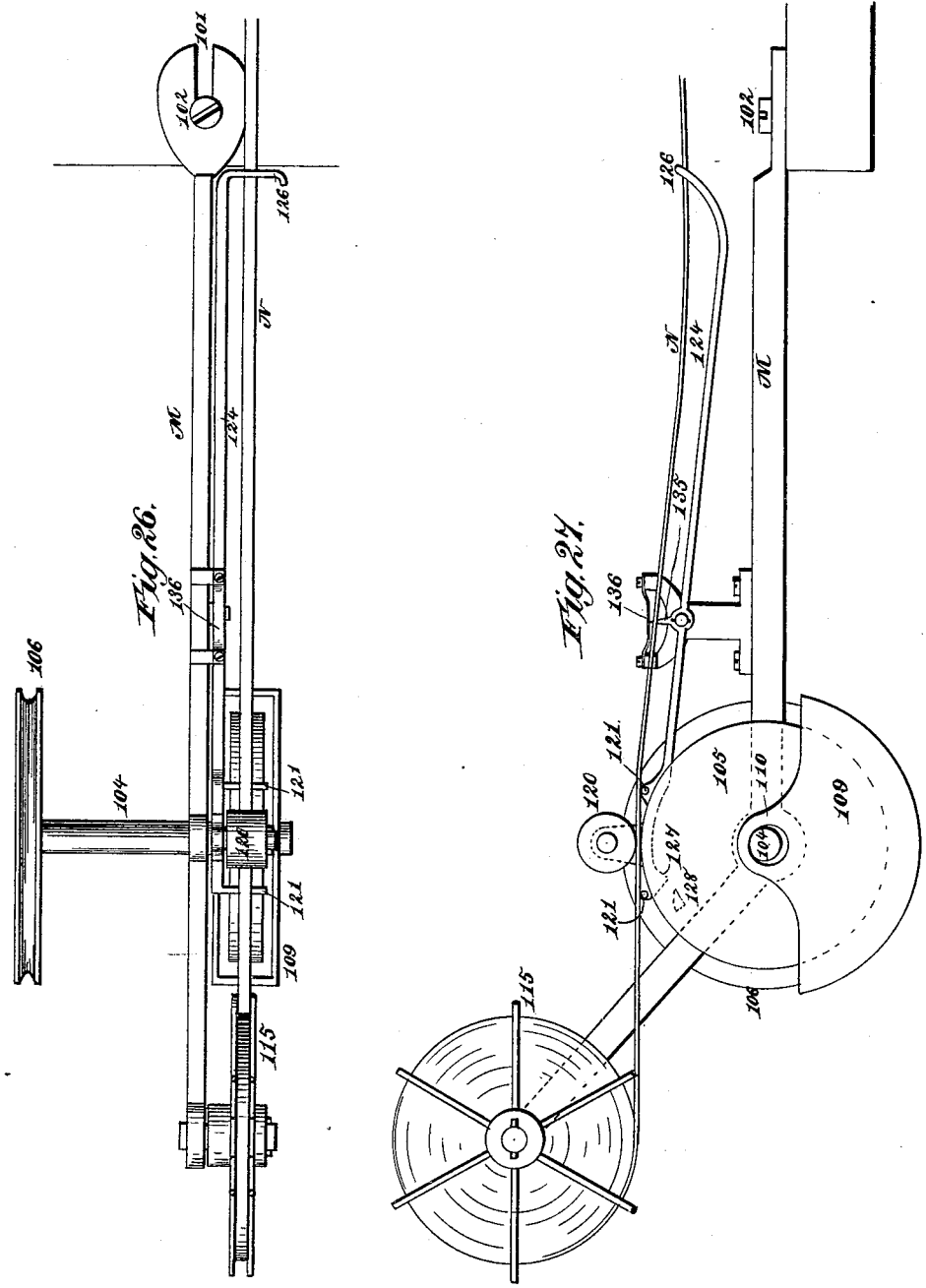

UNITED STATES PATENT OFFICE.

FRANK D. MALTBY, OF NEW YORK, N. Y., ASSIGNOR, BY MESNE ASSIGNMENTS, TO THE NATIONAL TYPOGRAPHIC COMPANY, OF WEST VIRGINIA.

MACHINE FOR MAKING TYPE-MATRICES.

SPECIFICATION forming part of Letters Patent No. 329,466, dated November 3, 1885.

Application filed April 10, 1883. Serial No. 91,254. (No model.)

*To all whom it may concern:*

Be it known that I, FRANK D. MALTBY, a citizen of the United States, residing at New York, New York, have invented new and useful Improvements in Type-Indenting Machinery, of which the following is a specification.

My invention relates to a machine for indenting paper for the purpose of producing a matrix from which to make stereotype-plates; and the novelty consists in the construction and arrangement of parts, as will be more fully hereinafter set forth, and specifically pointed out and indicated in the claims.

The general and principal design of the invention is to avoid the work of the compositor, and the heavy expense which is the result of a necessarily large stock of type, by means of mechanical devices, through the employment of which the molds or matrices are produced directly in the machine without the aid or employment of compositors, and without further stock of types than those contained in the machine itself.

The invention consists, essentially, in the mechanisms and combinations of mechanisms fully illustrated in the accompanying drawings, which form a part of this specification, and in which—

Figure 1:
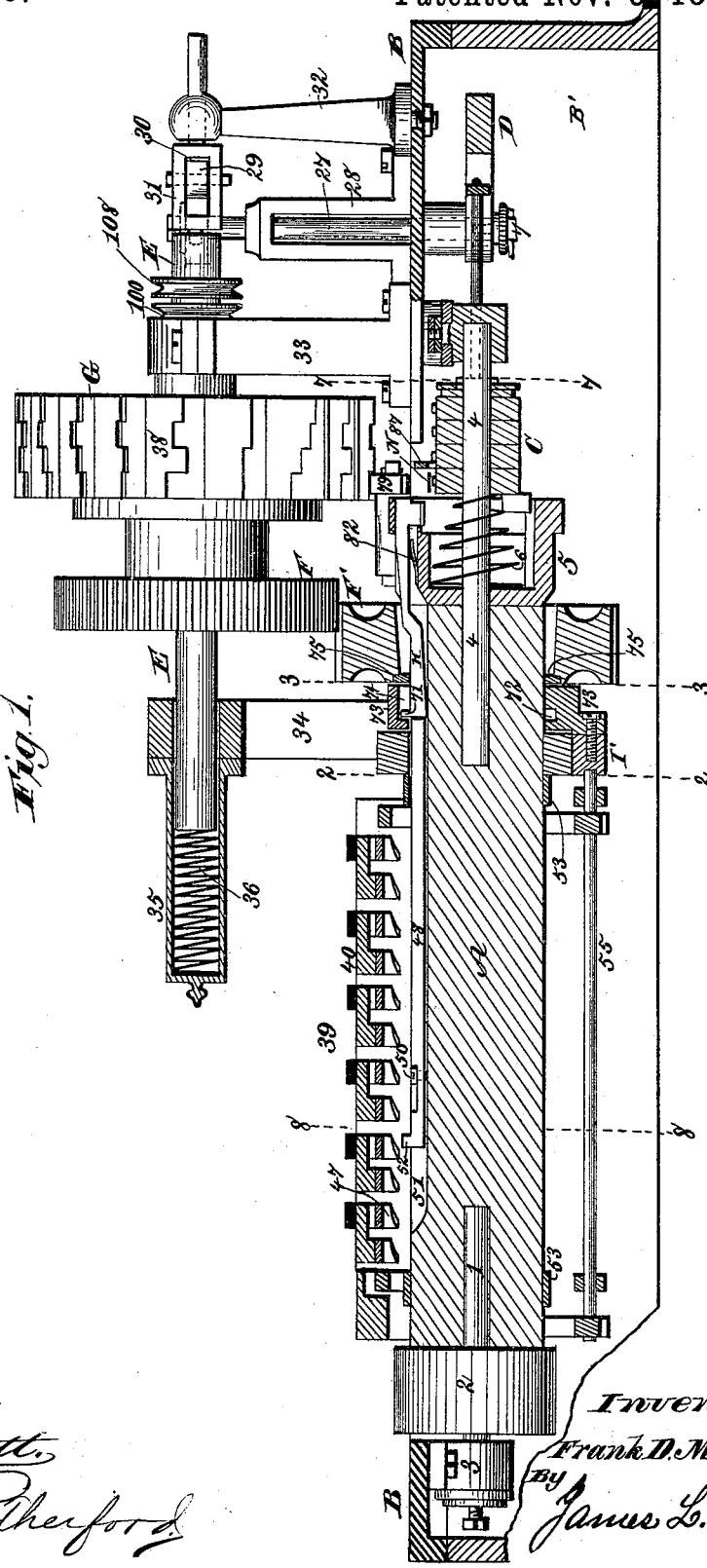
Figure 2:
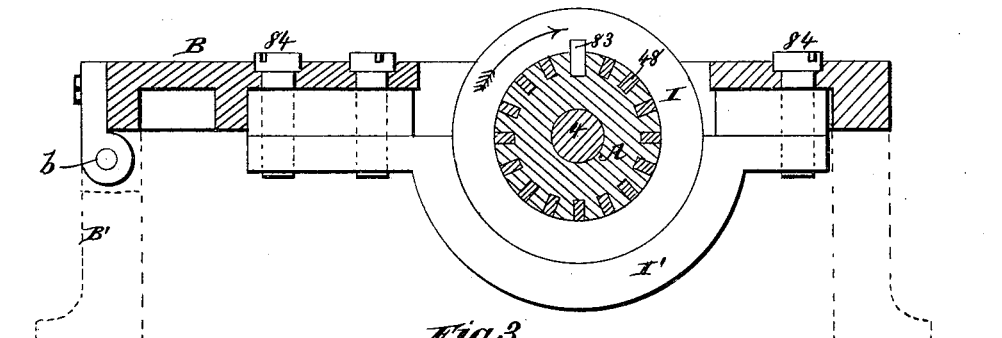
Figure 3:
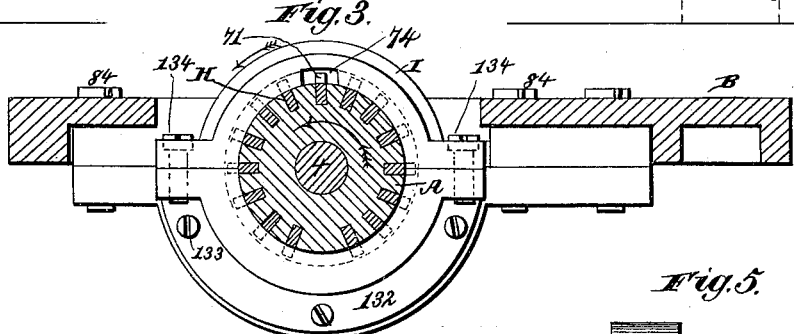
Figure 4:
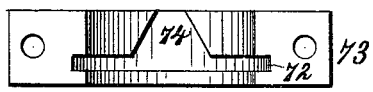
Figure 4:
Figure 5:
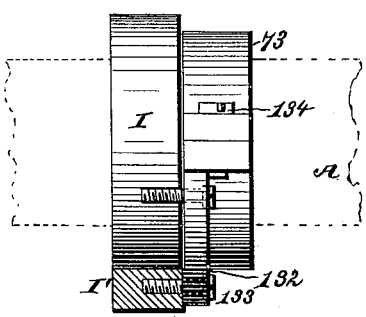
Figure 6:
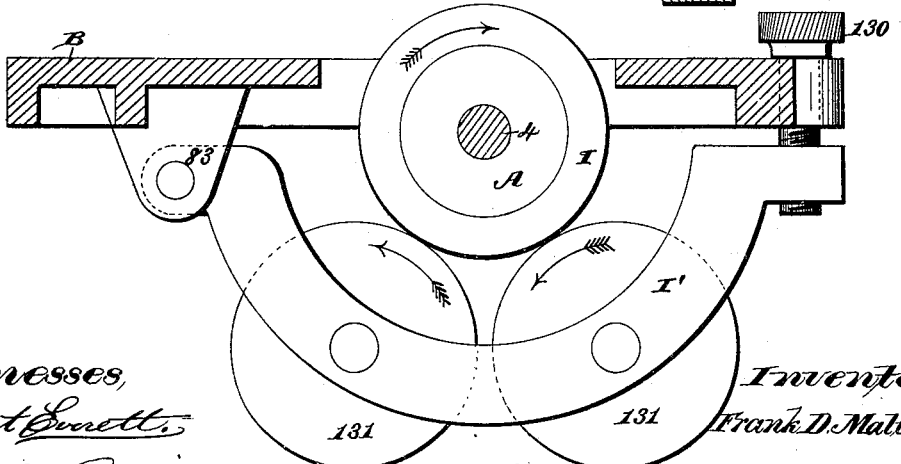

Figure 1 is a vertical longitudinal section with some of the parts in elevation. Fig. 2 is a transverse section on the line 2 2 of Fig. 1, showing the supports for the hammer-rod cylinder. Fig. 3 is a similar section on the line 3 3 of Fig. 1, looking in the opposite direction to show the hammer-race. Fig. 4 is a detail plan view of the two parts which go to make the hammer-race and cam. Fig. 5 is a detail elevation showing the hammer-race and the hammer-cylinder supports in position, with the said cylinder in dotted lines. Fig. 6 shows a modified means for supporting the cylinder—namely, friction rolls hung in a hinged bearing. Fig. 7 is a section on the line 7 7 of Fig. 1, showing a portion of the spacing-wheel, the dog and hammer in operation, and the clamping-lever depressed to allow the passage of the paper with the revolution of the type-disks, showing also the governor and the tension spring which it controls. Fig. 8 is a transverse section through the line 8 8 of Fig. 1, showing one of the keys in elevation and the means for locking and releasing the keys. Fig. 9 is a bottom view, showing mechanism for bringing any one of the type-disks into operation and illustrating the construction whereby said disks may be disengaged from the machine. Fig. 9$^a$ is a horizontal section, partly in elevation, of the type-disks and adjacent parts, showing means for locking said disks together, and a modification of the construction shown in Fig. 9 for permitting the removal of the type-disks. Fig. 9$^b$ is a transverse section of a portion of one of the type-disks. Fig. 10 is a detail showing the hook in which the guide-lever is engaged when in position, as shown in Fig. 9. Fig. 11 is a detail of the cam-lever which locks or releases the guide-lever. Fig. 12 is an edge view of the guide-lever, showing the guide-lug or swivel-bearing. Fig. 13 is an elevation of the gear which is keyed to the hammer-rod cylinder, showing one-half of the hammer-ring (that stops the outward throw of the hammer) detached. Fig. 14 is a detail modification of one half of the hammer-race, the hammer-guide only being modified. Fig. 15 is a detail section showing the relative position of the connecting-gear, which is also modified in respect to the hammer-race shown in Fig. 14. Fig. 16 is a detail perspective showing the paper-guide and the paper-clamping surface. Fig. 17 is a detail showing the paper-clamping lever having lateral paper-guides and cut away to allow the free rotation of the type-disks. Fig. 18 is a detail perspective showing the block containing the spring and slot for holding the clamping-lever to hold the paper against motion until the force of said spring is overcome by mechanisms which force the said paper against the types, as seen in Fig. 7. Fig. 19 is a detail perspective of the locking-bar. Fig. 20 is a plan view of the hammer-rod cylinder. Fig. 21 is a perspective view of the metal portion of one of the keys. Fig. 22 is a perspective view of one of the hammer-rods. Fig. 23 is a perspective detail of one of the hammers. Fig. 24 is a top plan view, partly in section, of the dampening apparatus. Fig. 25 is a side elevation of the same. Fig. 26 is a plan view of a modification of the dampening apparatus, and Fig. 27 a side elevation of the same.

Referring to the drawings, in which similar designating-marks of reference indicate like parts in all the figures, A, Figs. 1 and 20, designates the hammer-rod cylinder, having arranged rigidly therewith and centrally therein, at one end, a shaft, 1, carrying a pulley, 2, through which the power is received, and being journaled in the main frame B at 3. At the opposite end the cylinder A is similarly provided with a rigid shaft, 4, which carries the several type-disks, C, the said disks being forced to revolve with the shaft 4, but having free longitudinal motion thereon. Within a housing, 5, formed at this end of the cylinder, is located the spring 6, which, being of convolute form, allows itself to be compressed very closely, each fold fitting within the next adjacent one. One end of this spring 6 bears against the bottom of the chamber in which it is located, and the other against the series of type-disks C, thus serving with a constant force to hold said type-disks C against the action of a hand-lever, D, pivoted to the main frame at 7 and operating in locking-notches located in the side of the frame opposite the pivot. This lever D is held to its pivot 7 by a pin, 9, which may be readily disengaged when desired—as, for instance, when it is desired to remove the type-disks for any purpose. At a point at or near the center the lever D is provided with a threaded pin, 10, held in any desired and adjusted position by a jam-nut, 11, and said pin 10 has a bearing upon a cross-head, 12, held upon two horizontal rods, 13, which, passing through a perforated swiveled lug, 14, secured upon a locking-lever, 15, carry at their opposite ends a frame, 16, having a hook, 17, which hook 17 engages in an annular recess, 18, upon one of the type-disks. The locking-lever 15 is pivoted at 19, its free end engaging in a hook, 20, having an incline, 21, so that as said lever 15 is forced into engagement with said hook 20 it will ride up the incline 21 and lie close to the under side of the bed-plate, upon which it is pivoted. The lever 15 is locked or released by a cam, 22, operated by a lever, 23, and when said lever 23 is in the position shown in Fig. 9 a pin, 24, operating loosely in a perforation, 25, in said lever and held in one direction by the constant force of a spiral spring, 26, enters a recess in the bed-plate and holds the lever 15 securely locked in its hook 20. A modification of this construction is shown in Fig. 9ª, wherein the shaft 4 has a bearing in a plate, 140, which plate operates in guides 139, and through which plate the rods 18 pass. When it is desired to remove the type-disk for any purpose, the plate 140 is moved in its guides to the right until the shaft 4 passes from its bearing in said plate. The nut 137 may then be turned off, and by further moving the frame 12 18 16 in the same direction the type-disks pass off the shaft 4 and may be removed from the sleeve 135.

It must be understood that the cylinder and type-disks are designed to be continually rotated by power when the machine is in operation, and that the type-disks are of different characters, although they all may be formed in a single piece. For instance, referring to Fig. 9, the first disk from the left—that is to say, the first annular row of characters, may be all the small letters of the alphabet, the next may have the capital letters, the next figures or punctuation-marks, this arrangement being of any desired and approved order. When the machine is at rest, the lower-case Romans are in position to print. When a capital is needed, the lever D is carried forward by suitable mechanism operated by the foot, thereby bringing the upper-case letters in position to indent. When lower-case are again needed, the lever returns to its first position, and is held there by the action of the spring 6. If the third row, figures, &c., is needed, the handle is brought forward by hand and placed in its appropriate notch, 8. If italics are needed, the lever D is thrown forward by hand into a wide notch similar to the first, and upper and lower case letters may be had by similar action to that described for Roman letters. The action of the spring 6 is always to hold the handle D back against the first wall of any of the notches. The type-disks are keyed to the inner surface of the housing 5, as shown in Fig. 1. The arrangement of these disks and their bearings are illustrated in Figs. 9ª and 9ᵇ, in which 135 designates a sleeve or cylinder having an annular shoulder or flange, against which the type-disks abut, and to which is secured the projection 136, which operates in the recess in the cylinder A. This cylinder is fitted loosely on the shaft 4, and is threaded to receive a nut, 137, which is so cut away as to form the annular recess 18 when it is in position, and when the type-disks are forcibly held between it and the annular shoulder described each disk has a perforation, and when these perforations are in line they receive a pin, 141, which serves to hold the series of disks in proper relation to each other, a shoulder, 142, preventing said pin 141 from passing too far in one direction.

138 designates a steel ring sprung or otherwise secured upon the cylinder, each disk being cut away to receive one of such rings, and this ring has a flat bearing on which the types rest.

Instead of the construction described, the type-disks may be keyed to the shaft, as in Fig. 9, or a lug may be formed on the inner disk to engage with the recess in the housing 5, as in Fig. 1, the disks being locked together, as described, by a locking-pin similar to the pin 141. (Shown in Fig. 9ª.)

It being understood, then, that the particular construction or arrangement of types may be of any approved character, I will, for convenience, hereinafter designate this part of the mechanism as "type-disks." The end of the shaft 4 has a movable journal-bearing in the lever 15, as seen in Figs. 1, 9, and 12. Rigid with the lever D, and oscillating from the pivot 7 thereof, is a vertical shaft, 27, which, passing through the bed-plate B and through a bracket-frame, 28, secured thereto, carries upon its upper extremity a horizontal arm, 29, the free end of which is pivoted by a pin in a slot, 30, formed in a sliding frame, 31, journaled in a standard, 32. This frame 31 acts against the end of a shaft, E, which is journaled in standards 33 and 34, secured to the bed-plate B. A socket or barrel, 35, is secured to the standard 34, and the end of the shaft E operates in this barrel, a spring, 36, housed in the barrel and operating between the closed end thereof and the end of the shaft, serving with a constant force to hold the said shaft E against the action of the lever D. The shaft E, being thus susceptible of longitudinal movement, is provided with a rigid gear-wheel, F, and a type-spacing wheel, G, the gear F meshing with a connecting gear-wheel, F', which is rigid with the cylinder A, is of the same size as the wheel F, and carries the same number of teeth. The gear F' is provided with internal recesses, 37, as shown in Fig. 13, which register exactly with similar hammer-recesses formed in the cylinder A at that point. The gear F' may be shrunk upon the cylinder A, or it may be keyed thereon. It will be seen from Fig. 13 that the recesses 37 are cut at intervals, leaving an intervening block of metal which has bearing upon the cylinder A between the hammer-rod recesses. A key may be inserted in one or more of said recesses 37 and into a corresponding recess in the cylinder. It will thus be observed that as the cylinder A takes its motion from the pulley 2 and transmits such motion to the shaft E through the gear-connections F and F', the revolution of the shafts E and 4 must be exactly coincident, and that as the same lever D which operates to throw the type disks to the left also moves the shaft E, the spacing-wheel G and the type-disks C will have their movements, both rotary and longitudinal, also coincident. The spacing-wheel G is provided with as many space-blocks as there are type in the disk below it, and these projecting surfaces or space-blocks 38 are made to correspond with the width of the particular type against which such surface operates in the act of making the indentation—as, for instance, the surface 38, which acts in conjunction with the type l, will not be as wide as that surface which acts in conjunction with the type M—and this exact and proportionate arrangement follows throughout the entire series.

39 in Fig. 1 designates the key-board, its longitudinal plane being coincident with the plane of the machine, and 40, Fig. 8, one of the keys. These keys are arranged, black and white, as in a piano key-board, or alternately, as may be desired, the only important feature of this part of the invention being that each key, whatever the arrangement, shall have its own specific hammer-rod connecting with a specific hammer. The main body of the key 40 is of wood, to which is secured the metal part 41. These metal portions are all pivoted upon a single rod, 42, which passes through lateral perforations 43 in the butts of the parts 41; and to provide that each key shall retain its proper relative position each is provided with a longitudinal recess, 44, in which loosely operates a nib, 45, formed upon a bar, 46, housed within the wood-work of the key-board and common to all the keys. Each key-piece 41 has a beveled lug, 47, upon its lower surface, and these pieces being arranged transversely to the longitudinal plane of the cylinder A, the series of lugs 47 are arranged in a row directly over the cylinder. (See Fig. 1.) Each key-lug 47 has its appropriate hammer-rod 48, with a recess, 49, in which operates the head of a screw, 50, secured in the cylinder, to limit the stroke of the hammer-rod, and a beveled lug, 52, which projects radially outward beyond the surface of the cylinder, and which is adapted by its beveled face to impinge against the beveled lug 47 when the key 40 is depressed. The grooves 51 in the cylinder in number correspond with the number of characters on any one of the type-disks, and it is a necessary feature of this cylinder A that no two of its recesses 51 are of the same length; and to allow the greatest economy of space in this regard I arrange the said grooves or recesses spirally for one-half the circumference of the cylinder, and then return spirally in an opposite direction. The hammer-rods 48 have each a length proportioned to the length of the recess in which it lies, and when arranged therein the lugs 52 will project radially from the periphery of the cylinder A, the arrangement being such that any one of said lugs will lie between or alternate with the lugs lying upon the opposite curve of the spiral, so that its line of revolution will not be coincident with that of any other of the lugs in the hammer-rod series, as fully shown in Fig 20. It being then understood that each particular key has its own appropriate hammer-rod, and each hammer-rod its own appropriate hammer, and that these are inoperative until a key has been depressed, I will now describe the operation of these parts, referring particularly to Figs. 1, 8, and 19. Upon the cylinder A, near each end, is secured a band, 53, carrying a cam, 54, and to a proper rod, 55, is pivoted, having two distant bearings thereon, a trigger-frame, 56, each curved arm of which carries a roller, 57. Secured upon the bed-plate B is a barrel, 58, within which loosely operates a pin, 59, said pin being held outward against the frame 56 by the constant force of the spiral spring 60, housed within the barrel 58. The force of this spring is overcome at each revolution of the cylinder A by reason of the rollers 57 riding up the cam-surface 54. (See Fig. 8.) Secured to the main bar 61 of this frame 56 is a plate, 62, of tempered steel, which plate, when the spring 60 is exerting its force, is held toward the rabbeted ends 63 of the key portion 41, and pins 64 upon a transverse bar, 65, operate in slots 66 in the rabbeted ends of each key-piece 41, to further protect the keys from lateral play. With this construction in view, it will be observed that when a key is depressed its full stroke will not be made until the cam 54, through the action of the rollers 57, throws the locking-bar 56 back and the plate 62 from under the rabbeted bearings 63 of the key. As soon as this is done, the key is automatically locked in its depressed position by the spring 60, forcing the plate 62 back and over the end 63 of the key-piece 41, and it is not released from such position until the cam 54 repeats its service on the locking-bar 56. Meanwhile, however, the revolution of the cylinder A has brought the lug 52 of the appropriate hammer-rod 48 against the beveled lug 47 of the depressed key 41, and said hammer-rod 48 has forced the appropriate hammer in over the proper type. As soon as the depressed key is released, as aforesaid, a spring, 67, having a bearing in a socket, 68, in the bed-plate B at one end, and a bearing upon a pin, 69, located beneath the key at the other end, serves to throw said key back to its normal position. In this portion of the mechanism I wish to state that I attach importance to the construction and adaptation of the locking-bar 56 as shown. The duplex distant bearings insure an even stroke the entire length of the keyboard, and the single central spring, 60, obviates any wrenching strain, as might occur if two springs were employed and one should have less inherent force than the other.

I will now describe one of the hammers and its operation; but it will be understood that there are as many hammers as there are keys or type-characters.

H, Fig. 23, designates a hammer, a portion of which operates loosely in one of the recesses 51, one end abutting squarely against the adjacent end of its appropriate hammer-rod, 48. This hammer is preferably of the form shown in said Fig. 23, and is provided with an enlarged portion, 70, and a beveled lug, 71. This lug 71 of each hammer is adapted to ride idly in the race 72, formed in the cam-ring 73, except when its appropriate key has been depressed, and the operations hereinbefore described has thrown the hammer in one direction, and its end 71 is forced in the cam-recess 74. (Shown in Fig. 4.) This cam-ring 73 is formed in two parts, one part of which is provided with the cam-recess 74, and when in position the arrangement is such that the said recess 74 is on a line with the lugs 47 of the keys, so that neither of the hammers can be disturbed except when it is opposite the cam-recess 74. The ring 73 is stationary. The hammers H operate loosely in the recesses 37 in the wheel F', which register exactly with the longitudinal recesses 51, and to prevent the hammers from going too far—that is to say, to limit their stroke when they are in operation—I provide a check-ring, 75, formed in two parts and removable at will, said check-ring 75 having a bearing and fitting snugly in an internal annular recess, 76, formed in the said wheel F', adjacent to the cam-ring 73. (See Figs. 1 and 13.)

Instead of the two-part ring 75 shown in Fig. 13 and the cam-ring 73 as shown in Fig. 4, I may use the construction shown in Figs. 14 and 15, in which a thin flange, 77, limits the stroke of the hammer; but I prefer the ring and open cam-recess, as the said flange 77 would be liable to soon wear away and necessitate a new ring-section, while the ring 75 can be made of tempered steel, and a change be more easily and cheaply effected. By the proper manipulation of the lever D the type-disks and spacing-wheel G will be thrown into the position shown in Fig. 1—that is to say, with the left-hand row of types, the first in the series, within the throw of the hammer, which may at any time be in the line of operation or in the line of the cam-recess 74. This throw of a hammer brings its end 70 directly under the head 78 of a pawl, 79, pivoted on a stud-bearing, 80, secured to the bed-plate B. The parts are all timed so that when the key—say the M-key—is depressed and the M-hammer rod and M-hammer are operated, as has been explained, the part or head 70 of the hammer will ride along an incline, 81, of the pawl 79—which pawl simultaneously impinges upon the M-projection 38 of the spacing-wheel until the pawl presses the hammer-head 70 toward the M-type and the paper, being between the type and the hammer-head, is indented and carried along until the pawl passes from that particular projection. When the hammer-head is thrown up by a spring, 82, the beveled lug 71 of the hammer strikes the cam-surface of the recess 74, and that particular hammer is thrown back into its normal position, and the lug 71 continues its travel in the race 72 until it is again called for by the depression of its particular key. This same operation will be repeated every time that particular key is depressed, whichever row of type characters has been adjusted into position by the lever D.

It has been observed that, so far as described, the cylinder A has its journals through the shafts 1 and 4.

I have discovered that owing to the construction of the devices and to the pressure upon the type-disks, which pressure always comes from above, there is danger that the shaft 4 may be strained or bent, and it is evident that a very slight variation of the parts will frustrate the objects sought to be attained. I have provided for such emergency, and to the provisions employed I attach especial importance. Keyed to the cylinder A by key 83 is a ring of hardened steel, and this ring I sustains the greater part of the friction and wear due to the revolutions of the cylinder. This ring I is supported in a steel bearing, I', secured to the frame by screws 84, as shown in Figs. 2 and 3, or hinged to the frame at 83, and having an adjusting-screw, 130, as shown in Fig. 6, with or without the friction-rollers 131. The lower half of the hammer-race 73 has a flange, 132, which is secured to this bearing I' by screws 133, the upper half being secured to the lower half by screws 134. (See Figs. 3 and 5.) By this construction I provide a firm resisting bearing, and very efficiently protect and support the cylinder, which is made of softer metal, as of brass.

In describing the feed mechanism I refer particularly to Figs. 7, 16, 17, and 18. J designates a part of the frame arranged transversely to the longitudinal plane of the cylinder, and it is provided with a way, 85, through which the paper to be indented passes. Pivoted to this frame at 86 is a clamping-lever, 87, which, being provided with paper-guides 88 and 88ᵃ and curved at 89 to allow the free action of the type-disks, lies across the said disks, its free end resting upon a spring, 90, secured in a block, L, on the opposite side. The action of this spring tends constantly to clamp the paper strip between the bottom of the guide 88ᵃ and a beveled portion, 91, of the frame J, and this action upon the part of this spring continues until, as shown in Fig. 7, one of the hammers H is depressed. This action of a hammer not only forces the paper strip against the type to make an indentation, but at the same time a shoulder, 92, on the hammer H, striking upon the top of the curved portion 89 of the lever 87, serves to depress said lever, overcome the action of the spring 90, and release the paper strip. The paper thus released is now fed forward, being firmly held between the moving hammer and the type until the pawl 79 passes off from the projection 38, when both the spring 82 and the spring 90 assert themselves, and the hammer is thrown up, the lever 87 rises, and the paper is again clamped as before. While this contrivance for holding the paper, except when the indentation is actually being made, is complete in itself and may serve in most conditions, the fact that the cylinder works very rapidly, and that the speed of the device may at times render such contrivance insufficient to prevent the "fulling" of the paper at this point, suggests the necessity of more certain means. To this end I employ an ordinary governor, K, secured to the frame J directly over the way 85, a plunger, 93, of which bears upon a spring, 94, which spring 94 rests upon the paper and presses it upon the lower surface of the way 85. The plunger 93 has a head, 95, provided with an annular groove, 96, in which operate the ends of the weighted arms 97. The arms 97 are rotated by means of the belt-connection 98, between the pulley 99 and the pulley 100, which latter is hung on the shaft E, is forced to rotate therewith, but has free longitudinal motion thereon, to allow the manipulation of said shaft E by means of the lever D, as has been explained. By this means the tension of the paper may not only be properly adjusted for the ordinary speed of the machine, but the tension will be automatically made to accommodate any change in speed which may accrue. In this art it is necessary that the paper strip should be properly dampened, and I employ for this purpose the mechanisms shown in Figs. 24 and 25, in which M designates a single supporting-bar, removably pivoted to the back of the main frame by a slot, 101, engaging a screw or lug, 102, and having a journal-box, 103, in which is journaled the shaft 104 of a dampening-wheel, 105. This shaft 104 carries a rigid pulley, 106, which, by a belt-connection, receives its motion from the shaft E by means of a pulley, 108, which latter pulley is revolved by said shaft E, but has such free longitudinal movement thereon as allows its described manipulation by the lever D. The lower portion of the dampening-wheel 105 is at all times immersed in liquid held in a vessel, 109, having perforated ears 110, by which it is suspended from the shaft 104. A threaded boss, 111, formed on the frame M, provides a cylindrical bearing for an arm, 113, which is adjustably held thereon by means of the nut 112. By this construction not only may the frame M be turned or folded on the machine, but the arm 113 may be folded over on the frame M by loosening the nut 112, thus providing for a great economy of space. The arm 113 has a journal-bearing for a shaft, 114, carrying the reel 115. The feed of the paper N from this reel 115 is also tensioned by means of a spring 117, which, bearing between the arm 113 and an adjustable collar, 116, allows the friction of the reel to be adjusted by adjusting the resistance of the spring. The adjustability of the arm 113 by means of the nut 112 also allows the operator to maintain the proper relation between the paper and the dampening-wheel, as to direction, by elevating the reel when the reel is full and lowering it when a portion has been fed off. Pivoted to the frame M at 118 is a rocking lever, 119, carrying a roller, 120, which rides over the paper strip N and holds it to the wheel 105, which wheel has a pulp or other absorbent periphery, and having also arms 121, which pass under the paper, and are adapted to lift the paper from the wheel when the feed for any cause is stopped. Pivoted to a lug formed on the frame M at 125 is a gravity-lever, 124, having an arm, 126, which rests on the paper strip N, and an arm, 123, which acts against the end or upper surface of the arm 122 of the lever 119, according to the position of said lever. At each revolution of the wheel 105 a cam, 128, formed upon said wheel, impinges upon a lug, 127, formed upon or secured to the lever 119.

When the machine is in operation, as shown in Fig. 25, the tension of the strip will hold the lever 124 so that its arm 123 abuts against the arm 122 of the lever 119, and the intermittent oscillations of said lever 119, caused by the action of the lug 127 on the cam 128, will not change the operation of the device. If, however, the machine for any reason be stopped, the weight of the lever 124 will sag. the paper, and the subsequent revolution of the wheel 105, through the cam 128 and lug 127, will throw the lever 119 up, and the arm 123 will pass over the arm 122, and the paper be thus automatically held away from the wheel 105 until the paper, being again carried forward, raises the lever 124, and thus trips the lever 119.

In Figs. 26 and 27 I show a modification in which a knife edge, 135, acts under a delicate spring, 136; but in practice I prefer the construction described.

The operating parts of the machine—such as the key-pieces 41, the hammer-rods 48, the hammer H, the plate 62, hammer-race 73, hammer-rings 75, and the like—are greatly simplified in construction, so that they may be thoroughly hardened or tempered throughout with a uniform degree of resistance to wear.

Any one of the hammers may readily be removed when worn or broken by taking out the screws 134 and removing the ring 75.

In my machine it will be observed that the bed-plate B, which has many of the operating devices upon its under face, is hinged to the bed-frame B' by hinges b, so that the internal works are readily accessible by turning said plate on its pivot.

Modifications in details of construction may be made without departing from the principle or sacrificing the advantages of my invention, the essential features of which will be readily understood from the foregoing description, taken in connection with the drawings which form a part thereof.

Having thus fully described my invention, what I claim is—

1. In combination with a series of keys arranged as shown, and each key having a metal base, 41, with a central longitudinal slot, 44, a bar common to all the keys, having lugs 45, which operate loosely in said slots, to maintain the keys in their proper relation to each other, substantially as described.

2. In combination with a series of keys having metal bases 41, each provided with central longitudinal slots at either end, the bar 46, common to all such keys and having lugs 45 which operate loosely in the slots 44, and the bar 65, having pins 64, which operate loosely in the slots 66, substantially as and for the purpose set forth.

3. In combination with the keys and hammer-rods, a series of hammers having beveled lugs 71, and a hammer-way having a cam-recess, substantially as and for the purposes set forth.

4. In combination with a series of type-disks, a corresponding spacing-wheel, a series of hammer-rods, and a series of corresponding hammers, each having a beveled lug, 71, a hammer-race, 72, a cam-recess, 74, and a pawl, 79, substantially as and for the purposes set forth.

5. In combination with the cylinder A, having longitudinal recesses, and the gear F, having internal recesses which register therewith, a series of hammers operating loosely in said recesses, the hammer-race 73, and the two-part rings 75, against which the hammers abut to limit their throw, substantially as set forth, for the purpose specified.

6. In combination with the gear-wheel having recesses 37 and annular recess 76, the race 72, and cam-recess 74, the two-part ring 75, and the hammers, substantially as and for the purposes set forth.

7. In a machine substantially as described, having the bearing I' and cylinder A, having hardened friction-ring I, the hammer-race 73, made in two parts, the lower part having a flange, 132, by which it is secured to the bearing I', and the upper part being secured to the lower part by screws 134, substantially as and for the purpose specified.

8. In combination with the type-disks and the paper-guide J and block L, a lever pivoted to said guide J, and resting upon a spring upon the said block L, so as to lie across the type-disks, said lever being adapted to guide the paper across the disk and to automatically lock said paper when the indenting devices are not in operation, substantially as set forth.

9. In combination with the type-disks, the guide J, and block L, having spring 90, the lever 87, having guides 88 and 88ª and curve 89, and the hammers having lug 92, substantially as described.

10. In combination with the frame J, having paper passage or way 85 and inclined bearing 91, the spring 90, pawl 79, and hammer having lug 92, the lever 87, having guide-bearing 88ª and curved portion 89, substantially as and for the purposes set forth.

11. The combination, with a paper passage or way, 85, of a spring, 94, for holding the paper N between it and the bottom of said way, a governor for controlling the force of said spring, and connections, substantially as described, with the running-gear, whereby the confining force of the spring is automatically augmented by the increased speed of the machine, substantially as and for the purpose set forth.

12. In combination with the pulleys 99 and 100, the belt 98, and shaft E, the spring 94, pin 93, paper-way 85, and a governor, K, whereby the rate of speed of the said shaft E will automatically regulate the pressure of the spring 94 upon the paper N, substantially as set forth.

13. In combination with the plate B and the frame M, pivoted thereto so as to be folded thereon, a dampening-wheel journaled in said frame and connected to the shaft E by a belt, a liquid-holding vessel in which a portion of said wheel is immersed, and means, substantially as described, for automatically throwing the paper N out of contact with said wheel when the feed of the paper is stopped, substantially as described.

14. In combination with the pivoted frame M and reel-frame adjustably hinged thereto, the reel 115, having adjustable friction-spring, and the dampening-wheel having cam 128, the lever 119, having arms 121 and roll 120, the lever 124, having arm 126, and the lug 127 on said lever 119, arranged for operating with the paper N, substantially as and for the purposes set forth.

15. The combination, with the folding-frame M and dampening-wheel 105, of the reel-carrying arm 113, fitting loosely over the boss 111 on the frame M, and the adjusting-nut 112, substantially as described, whereby the said arm and reel may be adjusted to regulate the direction of the paper as it is fed to the wheel, as set forth.

16. In combination with the wheel 105, having cam 128, and the lever 119, having roll 120, lug 127, and arms 121 and 122, the lever 124, having arms 123 and 126, all arranged for operation upon the strip of paper or other material to be acted upon, substantially as and for the purpose specified.

17. In combination with a series of perforated type-disks, a cylinder or sleeve, 135, having an annular flange against which said disks abut, and to which is secured the pin 136, a nut, 137, arranged upon said sleeve for clamping the disks between it and said flange, substantially as set forth.

18. In combination with the sleeve 135, pin 136, and nut 137, the perforated disks and a pin, 141, having a shoulder, 142, said pin being common to all the disks, for operation substantially as described.

19. In combination with the sleeve 135 and the disks, the steel ring 138, constructed to furnish a flat bearing or seat for each type, substantially as set forth.

20. In combination with the disk-cylinder C and the frame 12, 16, and 18, having hook 17, the shaft 4, and the movable plate 140, operating in guides 139, substantially as and for the purposes set forth.

In testimony whereof I have hereunto set my hand in the presence of two subscribing witnesses.

F. D. MALTBY.

Witnesses:
JAMES L. NORRIS,
J. A. RUTHERFORD.